July 24, 1934.   R. W. WITTEMANN   1,967,799
CARBONATING APPARATUS
Filed July 1, 1933   2 Sheets-Sheet 1
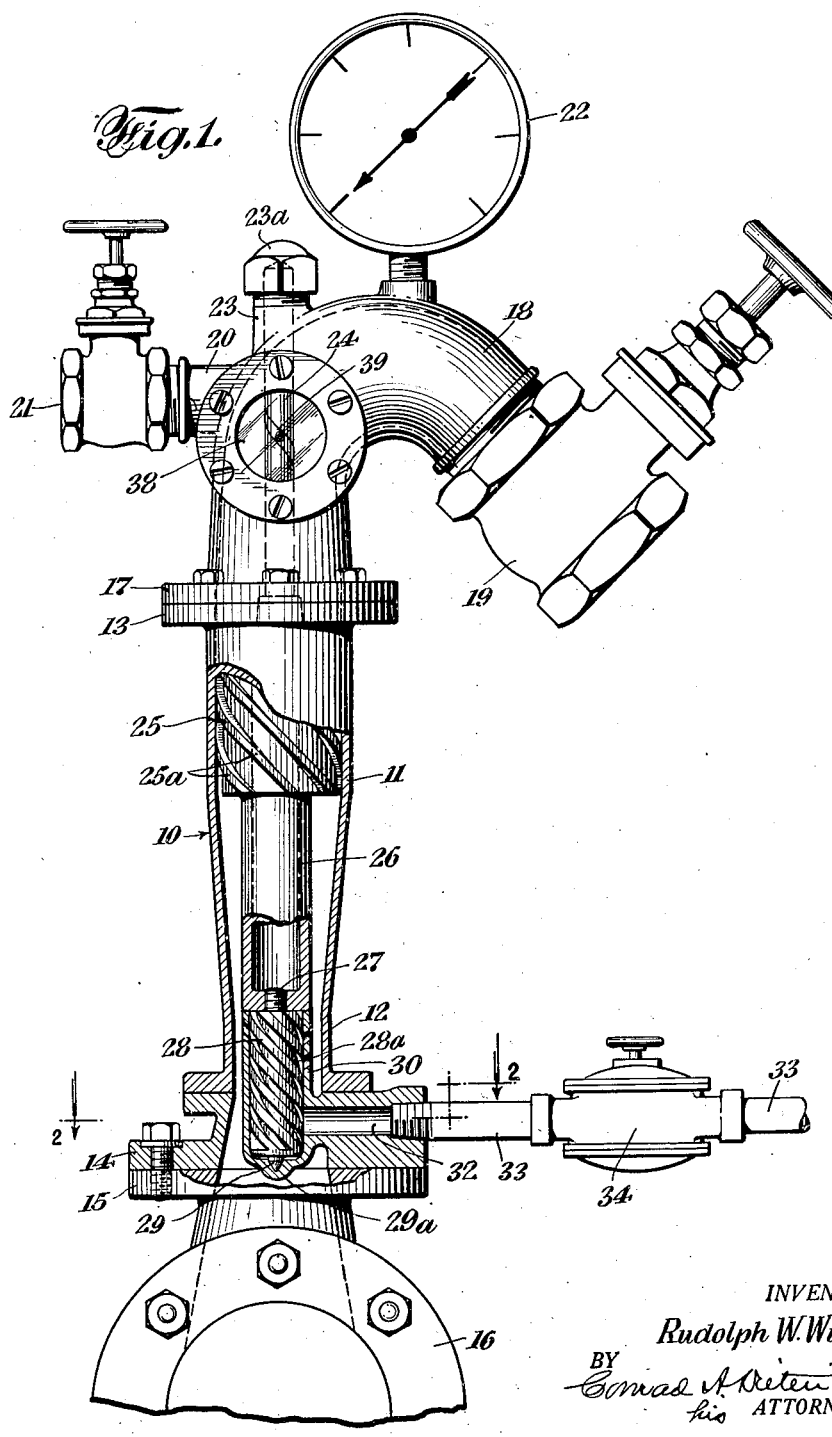
INVENTOR.
Rudolph W. Wittemann
BY
Conrad A. Dieterich
his ATTORNEY

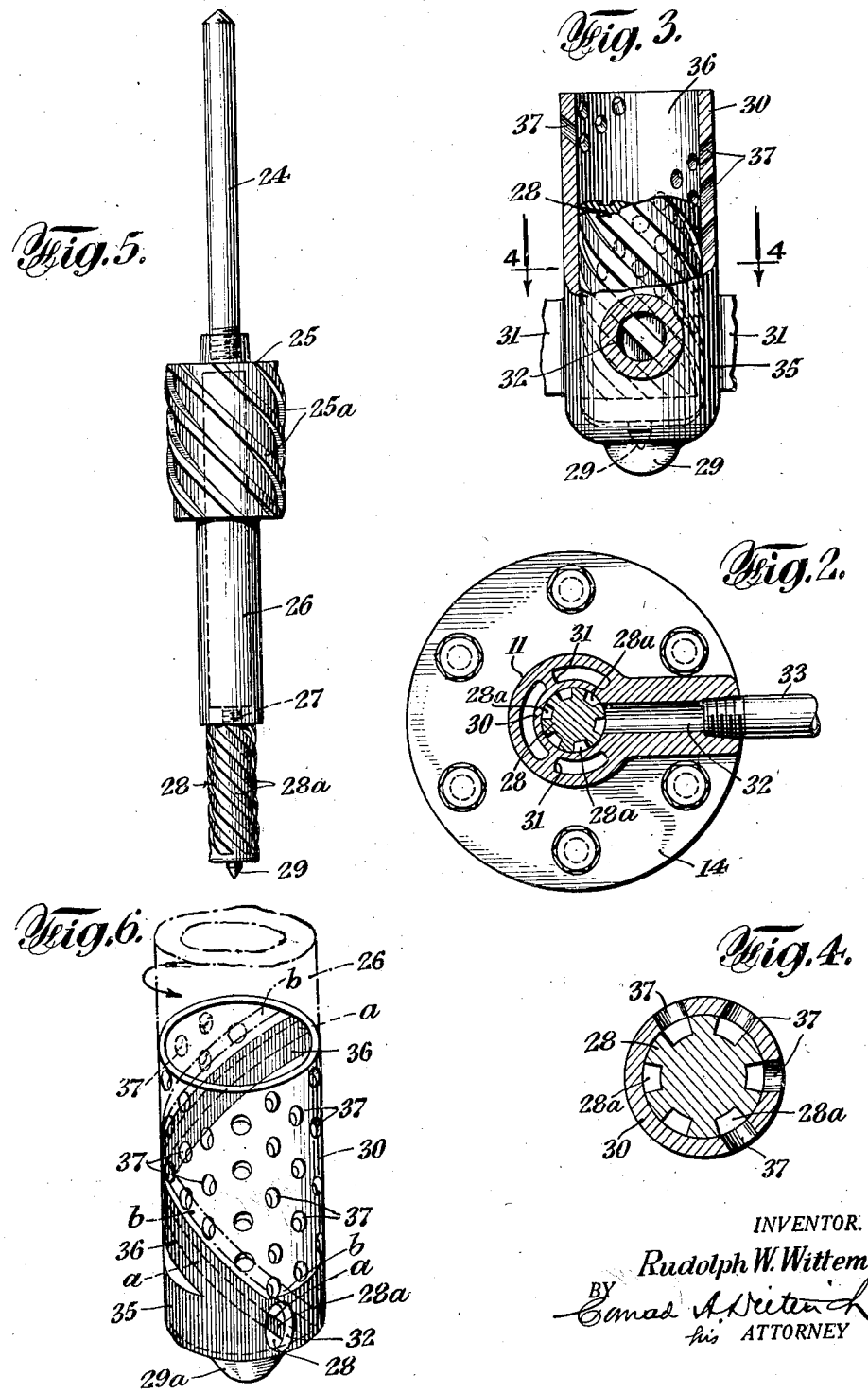

Patented July 24, 1934

1,967,799

UNITED STATES PATENT OFFICE 1,967,799

CARBONATING APPARATUS

Rudolph W. Wittemann, Brooklyn, N. Y.

Application July 1, 1933, Serial No. 678,597

13 Claims. (Cl. 261—79)

My invention relates to means for mixing fluids, and the same has for its object to provide an apparatus which is simple in construction, positive and efficient in operation, and inexpensive to manufacture.

Further, said invention has for its object to provide an apparatus whereby a plurality of different fluids may be mixed or combined in definite proportions or volumes.

Further, said invention has for its object to provide an apparatus whereby a plurality of different fluids may be automatically and positively mixed or combined in fixed proportions in accordance with the velocity of flow of one of said fluids through the apparatus.

Further, said invention has for its object to provide an apparatus whereby a fluid such as liquid or a gas may be combined with another fluid, such as a liquid or gas, in fixed proportions in accordance with the velocity of flow of fluid through the apparatus.

Further, said invention has for its object to provide an apparatus in which the mixture of a plurality of different fluids may be effected in definite or fixed proportions without regard to the pressure or pressures at which said fluids are admitted to the apparatus.

Further, said invention has for its object to provide an apparatus by means of which fluid, whether liquid or gaseous, may be mixed or combined in a succession of measured charges or quantities of uniform amount with another fluid passing through the apparatus so as to insure a constant and uniform mixture of said fluids in definite proportion regardless of the velocity of flow of the fluid through the apparatus.

Other objects will in part be obvious and in part be hereinafter described.

To the attainment of the aforesaid objects and ends my invention consists in the novel features of construction, and in the combination, connection and arrangement of parts hereinafter more fully described and then pointed out in the claims.

In the accompanying drawings—

Figure 1 is a side elevation, partly broken away and in section, showing one form for carbonating apparatus constructed according to, and embodying my said invention;

Fig. 2 is a transverse section on the line 2—2 of Fig. 1;

Fig. 3 is an enlarged detail side elevation, partly broken away and in section showing the metering valve;

Fig. 4 is a sectional view thereof on the line 4—4 of Fig. 3;

Fig. 5 is a detail side elevation of the rotor, metering valve and associated parts, and Fig. 6 is a phantom perspective view schematically showing the construction of the metering valve and its method of operation.

I have, for the purposes of illustration, shown my invention applied to the carbonating of beer and the like, and in said drawings 10 designates the apparatus as a whole comprising a tubular, body portion or casing 11 tapering from its opposite ends and having a constricted intermediate portion 12. The upper and lower ends of said body portion or casing 11 are provided, respectively, with flanges 13, 14. The lower flange 14 is secured by bolts to a conforming flange 15 provided on the outlet side of a centrifugal pump 16 which supplies the fluid to be treated. The upper flange 13 is connected by bolts to a conforming flange 17 of a delivery outlet or nozzle 18 having a valve 19 for controlling the passage of liquid through said outlet, and a by-pass or blow-off nozzle 20 at its opposite side provided with a valve 21. The outlet 18 is also provided intermediate the valves 18 and 21 with a pressure gage 22.

The outlet 18 is provided with a bearing 23 disposed in alignment with the longitudinal axis of the casing, in which bearing works the shaft portion 24 extending from a rotor 25 having a plurality of spiral vanes 25$^a$ in the cylindrical face thereof disposed substantially at an angle of 45° to the normal. The rotor 25 works within the wider, cylindrical upper end of the casing 11, and is provided with a hollow, depending stem or shaft part 26 the lower end of which is secured by a screw connection 27 to the upper end of a cylindrical metering valve 28 having a series of spiral grooves 28$^a$ in the face thereof forming pockets, and a pointed or conical bearing member 29 at its lower end which works in a socket 29$^a$ provided in the base of a cylindrical valve casing 30 arranged in the constricted portion 12 of the casing 11. The lower end of the valve casing 30 is maintained duly in position by integral webs or spider arms 31.

The casing 11 is provided adjacent to its lower end with an inlet 32 communicating at one end with the interior of the valve casing 30 and the metering valve 28, and at its other end with a pipe 33 leading from a suitable supply of gas under pressure. The pipe 33 is provided with a reducing valve 34 whereby the pressure of the gas entering the valve 28 may be maintained constant and uniform at any desired or predetermined pressure.

The metering valve casing 30 has an imperforate narrow lower wall portion or annular band 35 broken only by the intake port 32, and from the upper edge of said band 35 extends a relatively narrow, imperforate spiral band or wall portion 36 which is also arranged at an angle of 45°, and whose upper end terminates at the upper end of said valve casing 30. The remaining portion of said valve casing 30 above the annular band 35 and at both sides of the spiral portion 36 is provided with numerous outlet openings 37 arranged in a series of spirals which extend upward at an angle of about 45°, and in the same direction as that of the spiral grooves 28ª in the valve 28.

The arrangement of the inlet opening 32 communicating with the valve casing 30 with respect to the outlet openings 37 is such that when the lower end or portion of one of the spiral grooves 28ª in the valve 28 is in position opposite to said inlet opening 32 to receive a gas charge, the upper end of said spiral groove will be sealed by the spiral wall portion 36 of the casing 27, and thus prevent the flow of gas directly from the inlet 32, by way of the outlet openings 37 in the casing 27, to the interior of the casing 11. In other words both inlet and outlet ends of any one of the grooves 28ª of the valve 28 cannot communicate with both the intake inlet 32 and the outlet openings 37, otherwise, it would be impossible for each of said grooves to receive a measured charge of gas to be delivered into the casing 11 for mixing with the beer or liquid to be carbonated in passing through said casing 11.

The outlet 18 is provided in its side with a glass-covered sight opening 38, and the valve stem 24 is provided with a suitable mark or device 39 visible through said opening 38 to indicate when the rotor 25 and its associated parts are revolving.

The upper end of the bearing 23 is screw threaded and provided with a cap nut 23ª, which may, when desired be removed, to permit of the attaching of a speed indicator or recording device to the end of the shaft 24 therein.

In order better to understand the construction and operation of the metering valve the same is illustrated diagrammatically by a phantom perspective view at Fig. 6. In this view the valve 28 is for the purpose of clearness, shown with only one spiral groove or pocket 28ª; the said groove being shown in two successive positions. In the first position, shown in part by broken lines, (a) the entrance end of the spiral groove 28ª or pocket is shown opposite the intake part 32 of the valve casing 30 and the outlet remainder of the said groove sealed or covered mainly by the spiral wall portion 36 of the casing 30. In this position the spiral groove is ready to receive a measured gas charge. In the second position (b) shown by line and dot, the valve 28 has been rotated anticlockwise in the direction of the arrow sufficiently to move the intake end of the spiral groove 28ª out of register with the intake port 32 of the valve casing and into the line and dot position (b) in which position the intake end of said groove is no longer in position to receive gas through the intake port 32, but the remainder of said groove is in communication with the first spiral series of outlet openings 37 of the casing 30, and permits gas to be drawn through said outlet openings 37 and into the interior of the casing 11. Should any portion of the gas remain in the spiral groove 28ª after passing by the first spiral series of outlet openings 37, then it will be caused to issue from or be drawn therefrom through the succeeding spiral series of outlet openings 37. As the valve 28 is maintained in constant and rapid rotation by the action of the rotor 25 under the influence of the liquid passing through the casing 11, the action just described of the metering valve 28 will be repeated for each spiral groove or pocket 28ª, and cause gas to be uniformly delivered to the liquid in a succession of measured charges. The proportion of gas to liquid will be constant for any velocity of flow of fluid through the casing 11 according to the pressure at which said gas is delivered to the metering valve, from the pipe 33.

The operation of the apparatus will be largely obvious from the foregoing description. It will merely be necessary to note that in the carbonating of beer, for example, the beer will be delivered by the pump 16 to the inlet at the base of the casing 11, and pass upwardly into the constricted passage around the outer side of the metering valve casing 30, and thence pass upwardly into the wider portion of said casing and into contact with the rotor 25 and the spiral vanes 25ª thereof; and cause the rotor 25 and its associated parts to revolve at a rate according to the velocity with which the centrifugal pump 16 delivers the same. As the rotor 25, shaft 26 and metering valve 28 revolve, carbonic acid gas which is supplied to the intake 30 at a predetermined pressure controllable by the reducing valve 34, the spiral grooves 28ª of the metering valve 28 will successively receive a measured charge of gas which, as the valve 28 rotates, will be caused to issue from the outlet apertures 37 in the casing 30, partly due to the pressure of the gas, and partly due to suction action produced by the passage of the fluid through the casing 11, and thereupon pass into the wider portion of the casing 11 and there mingle with or be absorbed by the beer in passing through the casing 11, and into the delivery outlet or nozzle 18 and valve 19, and thence to the storage container or the shipping packages, as the case may be.

It is to be noted particularly that by means of my apparatus I am enabled to supply gas in definite or measured quantities to given volumes of beer without regard to the velocity of flow of the beer, and to accomplish this end it merely becomes necessary to predetermine the amount of gas to be supplied to each unit of quantity of beer, and then regulate the pressure at which said gas is admitted to the casing 11.

Further, it will, of course, be understood that while I have shown and described my invention in connection with the carbonating of beer, that the invention is not limited thereto, and that the same may be used for the mixing of two or more fluids, whether the same be liquid or gaseous or combinations thereof.

Further, it is to be noted that if the rotor 25 and associated metering valve 28 cease to operate at any time, the valve 28 will be closed to the outlets 37, and thus prevent any gas reaching the interior of the casing 11.

Having thus described my said invention, what I claim and desire to secure by Letters Patent is:

1. An apparatus of the character described comprising a casing having passage of Venturi-tube form therein, a plurality of fluid inlets and an outlet communicating therewith, a shaft in said casing, a rotor on said shaft responsive to the velocity of flow of liquid through said casing for actuating said shaft, and a metering valve on said shaft disposed in the constricted portion of said casing controlling one of said fluid inlets; said metering valve having pockets therein serving to supply fluid to said casing in a succession of measured charges in accordance with the velocity of flow of the fluid passing through said casing.

2. An apparatus of the character described comprising a tubular casing having a constricted passage therein, a plurality of fluid inlets and an outlet communicating therewith, a shaft in said casing, a rotor fixed on said shaft responsive to the velocity of liquid through said casing for actuating said shaft, a valve casing disposed within said tubular casing having an intake port communicating with one of the fluid inlets of said tubular casing and outlet ports communicating with the interior of said tubular casing, and a metering valve fixed on said shaft and working in said valve casing for supplying another fluid to said tubular casing in a succession of measured charges to the fluid passing through said tubular casing.

3. An apparatus of the character described comprising a tubular casing, a plurality of fluid inlets and an outlet communicating therewith, a shaft in said casing, means on said shaft responsive to the velocity of flow of liquid through said casing for actuating said shaft, a valve casing disposed within said tubular casing having an annular wall portion provided with an intake port communicating with one of the inlets in said tubular casing, an imperforate spiral wall portion extending upwardly from said annular portion, and a plurality of outlet ports above said annular wall portion communicating with the interior of said tubular casing, and a metering valve on said shaft having pockets therein adapted to communicate successively with the intake and outlet ports in said valve casing and serving to supply fluid to said casing in a succession of measured charges.

4. An apparatus of the character described comprising a tubular casing having a constricted intermediate portion, a plurality of fluid inlets adjacent to one end of said casing and an outlet adjacent to the other end of said casing, a shaft in said casing, a rotor on said shaft responsive to the velocity of flow of liquid through said casing for actuating said shaft, a valve casing disposed in said casing at its constricted portion having an annular wall portion provided with an intake port communicating with one of the inlets in said tubular casing, an imperforate spiral wall portion extending upwardly from said annular wall portion, and a plurality of spiral series of outlet ports above said annular wall communicating with the interior of said casing, and a metering valve disposed in said second-named casing and fixed on said shaft controlling one of said fluid inlets; said metering valve having a series of spiral pockets therein serving to supply fluid from the other of the fluid inlets in said first-named casing to the interior thereof in a succession of measured charges in accordance with the velocity of flow of the fluid passing through said first-named casing.

5. In an apparatus of the character described, a valve comprising a casing having an annular wall portion adjacent to one end thereof, an intake port in said annular wall portion, a spiral wall portion extending from said annular wall portion, a plurality of outlet ports in the remaining wall portion of said casing, and a valve member working in said casing having a plurality of pockets therein; said spiral wall portion serving to maintain the outlet portions of said pockets closed while the intake ends thereof are successively open to the intake port of said casing.

6. In an apparatus of the character described, a valve comprising a casing having an annular wall portion adjacent to one end thereof, an intake port in said annular wall portion, a spiral wall portion extending upwardly from said annular wall portion, a plurality of spiral series of outlet ports in the remaining portion of the wall of said casing above said annular portion, a cylindrical valve working in said casing having a series of spiral pockets therein; said spiral wall portion serving to maintain the outlet portions of said spiral pockets closed while the intake ends thereof are successively in communication with the intake port of said casing.

7. An apparatus of the character described comprising a conduit, means for forcing a liquid through said conduit, a rotor within said conduit responsive to the velocity of flow of liquid through said conduit, metering means within said conduit driven by said rotor for supplying a gas to the liquid flowing within the conduit in accordance with the velocity of flow of said liquid, and a regulatable pressure reducing valve for controlling the pressure of the gas supplied to said metering means.

8. An apparatus of the character described comprising a conduit, means for forcing a fluid through said conduit under pressure, a rotor in said conduit rotated by said fluid in accordance with the velocity thereof, and means for supplying another fluid to said conduit including a metering valve disposed within said conduit and actuated by said rotor; said metering valve including means for discharging a succession of measured charges of the second mentioned fluid directly into the stream of the first mentioned fluid within said conduit subject to the suction effect thereof.

9. An apparatus of the character described comprising a conduit having an inlet and an outlet for the passage of a liquid, a rotor within said conduit operated by the liquid passing therethrough, and a metering valve within said conduit anterior to said rotor and actuated thereby for delivering measured charges of a gas to said liquid.

10. An apparatus of the character described comprising a conduit having an inlet and an outlet for the passage of a fluid, a rotor having spiral grooves on the periphery thereof and substantially fitting said conduit; said rotor being actuated by the passage of fluid through said grooves, and a metering valve on said rotor at the anterior end thereof, said metering valve and said conduit forming a relatively restricted mixing chamber therebetween, and said metering valve serving to supply another fluid to said chamber in a succession of measured charges in accordance with the velocity of flow of the first mentioned fluid.

11. An apparatus of the character described comprising a conduit having an inlet and an outlet for the passage of a fluid, a shaft disposed axially within said conduit, a rotor on said shaft substantially fitting said conduit and including spiral passages for the passage of fluid for rotating the rotor in accordance with the velocity of the fluid, and a metering valve driven by said shaft at the anterior end of said rotor for controlling the supply of another fluid to said conduit; said shaft and said valve forming with the conduit an annular mixing chamber in advance of said rotor.

12. An apparatus of the character described comprising a conduit having an inlet and an outlet for the passage of a fluid, a shaft disposed axially within said shaft conduit, a rotor on said shaft responsive to the fluid velocity for actuating said shaft, a valve casing disposed centrally within said conduit and having inlet and outlet ports for the passage of another fluid into said conduit into admixture with the fluid therein, and a valve member disposed within said casing and operated by said shaft; said valve member having a series of pockets therein disposed so that each pocket communicates alternately with the inlet and outlet ports of said casing.

13. An apparatus of the character described comprising a valve including a tubular casing having an intake port in the wall thereof adjacent one end; said wall including an imperforate portion extending spirally from said port and a perforate portion beyond the imperforate spiral portion, and a valve member working in said casing having a series of spiral pockets therein; said spiral wall portion serving to maintain the outlet portion of said spiral pockets closed while the intake ends thereof are successively in communication with the intake port of said casing.

RUDOLPH W. WITTEMANN.